United States Patent
Cleveland et al.

(10) Patent No.: US 7,483,406 B2
(45) Date of Patent: Jan. 27, 2009

(54) APPARATUS AND METHOD FOR IMPLEMENTING VIRTUAL MIMO ANTENNAS IN A MOBILE AD HOC NETWORK

(75) Inventors: Joseph R. Cleveland, Richardson, TX (US); Cornelius Van Rensburg, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 635 days.

(21) Appl. No.: 10/837,495

(22) Filed: Apr. 30, 2004

(65) Prior Publication Data

US 2005/0243756 A1 Nov. 3, 2005

(51) Int. Cl.
H04Q 7/00 (2006.01)
(52) U.S. Cl. .................. 370/328; 370/338; 370/208; 455/456; 455/457; 455/420
(58) Field of Classification Search .................. 455/403, 455/345, 457, 420, 456.1, 452, 450, 456; 370/252, 208, 281, 328, 348
See application file for complete search history.

(56) References Cited

U.S. PATENT DOCUMENTS

| | | | |
|---|---|---|---|
| 6,574,266 B1 | 6/2003 | Haartsen | |
| 2001/0018336 A1* | 8/2001 | Okajima et al. | 455/403 |
| 2002/0122382 A1* | 9/2002 | Ma et al. | 370/208 |
| 2002/0136327 A1 | 9/2002 | El-Gamal et al. | |
| 2002/0146999 A1* | 10/2002 | Witte | 455/345 |
| 2003/0128658 A1* | 7/2003 | Walton et al. | 370/208 |
| 2003/0165113 A1 | 9/2003 | Hudson | |
| 2004/0066754 A1* | 4/2004 | Hottinen | 370/252 |
| 2004/0209627 A1* | 10/2004 | Shiraga | 455/456.1 |

FOREIGN PATENT DOCUMENTS

WO WO 2004/023720 A2 3/2004

OTHER PUBLICATIONS

Mischa Dohler et al., "Higher Order Space-Time Block Codes for Virtual Antenna Arrays" Telecommunication 2003, ICT 2003, 10th International Conference on Feb. 23-Mar. 1, 2003, IEEE, vol. 1, Feb. 23, 2003, pp. 198-203.

S. Barbarossa et al., "Cooperative Diversity Through Virtual Arrays in Multihop Networks", 2003 IEEE International Conference on Acoustics, Speech, and Signal Processing Proceedings (ICASSP), Apr. 6-10, 2003, vol. 1 of 6, Apr. 6, 2003, pp. 209-212.

* cited by examiner

*Primary Examiner*—Charles N Appiah
*Assistant Examiner*—Michael T Vu

(57) ABSTRACT

A mobile station for use in a wireless network comprising a first base station that transmits user data streams in a forward channel using a multiple-input, multiple-output (MIMO) antenna system. The mobile station implements a virtual MIMO antenna system to receive MIMO data signals transmitted by the first base station. The mobile station comprises first and second transceivers. The first transceiver receives the MIMO data signals transmitted by the first base station and stores a first plurality of MIMO data signal samples in a memory. The second transceiver receives directly from a second mobile station a second plurality of MIMO data signal samples received by the second mobile station from the first base station. The second plurality of MIMO data signal samples are stored in memory. A MIMO algorithm generates from the first and second plurality of samples the user data streams transmitted by the base station.

20 Claims, 3 Drawing Sheets

APPARATUS AND METHOD FOR IMPLEMENTING VIRTUAL MIMO ANTENNAS IN A MOBILE AD HOC NETWORK

TECHNICAL FIELD OF THE INVENTION

The present invention generally relates to wireless networks and, more specifically, to a mobile ad hoc network (MANET) that enables single antenna mobile stations to take advantage of a wide area wireless network that uses multiple-input, multiple output (MIMO) antennas.

BACKGROUND OF THE INVENTION

Wireless communications systems, including cellular phones, paging devices, personal communication services (PCS) systems, and wireless data networks, have become ubiquitous in society. Wireless service providers continually try to create new markets for wireless devices and to expand existing markets by making wireless devices and services cheaper and more reliable. The price of end-user wireless devices, such as cell phones, pagers, PCS systems, and wireless modems, has been driven down to the point where these devices are affordable to nearly everyone.

To maximize usage of the available bandwidth, a number of multiple access technologies have been implemented to allow more than one subscriber to communicate simultaneously with each base station (BS) in a wireless system. These multiple access technologies include time division multiple access (TDMA), frequency division multiple access (FDMA), and code division multiple access (CDMA). These technologies assign each system subscriber to a specific traffic channel that transmits and receives subscriber voice/data signals via a selected time slot, a selected frequency, a selected unique code, or a combination thereof.

Wireless equipment manufacturers currently are developing wireless local area networks (WLANs) that are intended to deliver high-speed data to wireless devices, including cell phones and wireless laptops. However, consistently achieving high throughputs to wireless devices has proved elusive in many respects due to interference, multipath fading, and other effects. To overcome these problems, improvements are being made in many areas, including, medium access control (MAC) techniques, radio frequency (RF) components, modulation techniques, and smart antenna systems.

Smart antenna systems that use multiple antennas for both transmitting and receiving are particularly effective in increasing the data rate between a wireless network and a wireless terminal (or mobile station). Such multiple antenna systems are often called multiple-input, multiple-output (MIMO) antenna systems. A MIMO system has numerous advantages over a conventional single-input, single-output (SISO) antenna system, particularly in radio frequency (RF) environments that exhibit a large amount of multipath.

In a MIMO antenna system, a high-rate data stream is divided into multiple lower-rate data streams. The lower-rate data streams are individually modulated and transmitted through separate antennas at the same time and using the same frequency channel. The multiple transmitted signals experience multipath reflections as the transmitted signals travel from the multiple antennas of the base station to the multiple antennas of the receiving mobile station. The output of each receiver antenna is a linear combination of the multiple transmitted RF signals. Within the receiver, the multiple lower-rate data streams are detected and recovered by well-known MIMO algorithms.

Using multiple antenna arrays takes advantage of the spatial dimension of RF channel in order to increase throughput. This is known as spatial multiplexing and it provides a multifold increase in throughput. For example, using an N antenna array at the base station to transmit to an N antenna array at the mobile station increases the peak throughput of a MIMO antenna system by a factor of N over a conventional SISO antenna system. Advantageously, the MIMO antenna system has the same frequency bandwidth as the SISO antenna system. As a result, a MIMO antenna system provides a higher data rate to each mobile station and decreases delays in the RF link.

However, the primary drawback to using a MIMO antenna system is the physical size of the antenna array. In order to gain the benefit of a MIMO antenna system, it is preferable that the antennas have a significant spatial separation—on the order of ten (10) wavelengths. At the frequencies of interest, this requires an antenna separation on the order of a meter. This is highly impractical for nearly all cell phone and laptop computer implementations. In these cases, the antenna would be several times the size of the mobile phone or mobile PC.

Therefore, there is a need in the art for improved wireless networks having increased data throughput. In particular, there is a need for a wireless network that uses multiple-input, multiple-output (MIMO) antenna arrays to transmit data to a cell phone or other small-sized mobile station without requiring an oversized MIMO antenna at the cell phone or other mobile station.

SUMMARY OF THE INVENTION

The present invention provides a virtual MIMO antenna array for mobile stations by using a mobile ad hoc network (MANET) to exchange received signal data among a group of neighboring mobile stations. Each mobile station uses a conventional single-input, single-output (SISO) antenna system to receive and sample multiple signals received from a base station that uses a MIMO antenna system to transmit. The base station transmits over a wide area using conventional wireless standards, such as CDMA2000, IEEE 802.16e, IEEE 802.20, and the like.

Each mobile station transmits the signal samples received directly from the base station to neighboring mobile stations using a MANET link that typically has a shorter range and a higher data rate. Each mobile station also receives similar base station signal samples from the neighboring mobile stations using the high-speed MANET link. In this manner, each base station receives multiple signal samples from a group of spaced apart antennas in the same manner as if the mobile station was equipped with a MIMO antenna system instead of a SISO antenna system. Thus, the present invention provides a virtual MIMO antenna system for each mobile station.

To address the above-discussed deficiencies of the prior art, it is a primary object of the present invention to provide a first mobile station for use in a wireless network comprising a first base station capable of transmitting a plurality of user data streams in a forward channel using a multiple-input, multiple-output (MIMO) antenna system. The first mobile station implements a virtual MIMO antenna system to receive MIMO data signals transmitted by the first base station. According to an advantageous embodiment of the present invention, the first mobile station comprises: 1) a first transceiver capable of receiving and down-converting the MIMO data signals transmitted by the first base station and storing a first plurality of samples of the MIMO data signals in a memory of the first mobile station; and 2) a second transceiver capable of communicating directly with a second mobile station and receiving from the second mobile station a second plurality of samples of MIMO data signals received by the second mobile station from the first base station, wherein the first mobile station stores the second plurality of samples of MIMO data signals in the memory.

According to one embodiment of the present invention, the first mobile station further comprises a data processor capable of executing a MIMO algorithm, wherein the MIMO algorithm generates from the first and second plurality of samples the plurality of user data streams transmitted by the base station.

According to another embodiment of the present invention, the second transceiver communicates directly with the second mobile station over a mobile ad hoc network (MANET) link.

According to still another embodiment of the present invention, the data processor detects in the plurality of user data streams first data directed to the first mobile station.

According to yet another embodiment of the present invention, the mobile station uses a single-input, single output (SISO) antenna system coupled to the first transceiver to receive the MIMO data signals transmitted by the first base station.

According to a further embodiment of the present invention, the second transceiver transmits the first plurality of samples of the MIMO data signals to the second mobile station.

According to a still further embodiment of the present invention, the second transceiver is further capable of communicating directly with a third mobile station and receiving from the third mobile station a third plurality of samples of MIMO data signals received by the third mobile station from the first base station, wherein the first mobile station stores the third plurality of samples of MIMO data signals in the memory.

According to a yet further embodiment of the present invention, the MIMO algorithm generates from the first, second and third plurality of samples the plurality of user data streams transmitted by the base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
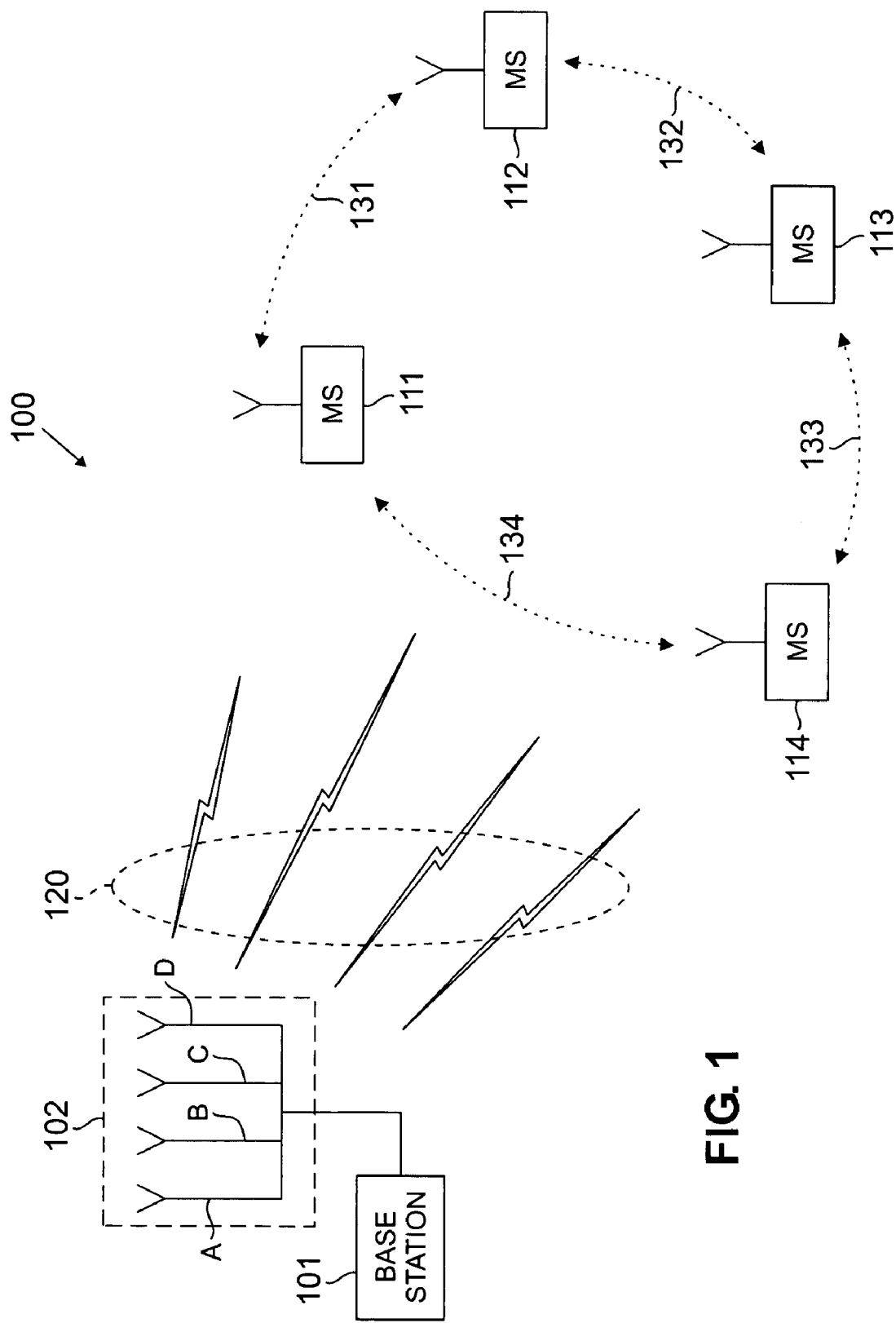
FIG. 1 illustrates a communication system that includes portions of a wide-area wireless network and a mobile ad hoc network (MANET) that provides virtual multiple-input, multiple-output (MIMO) antenna systems to mobile stations according to the principles of the present invention.
Figure 2:
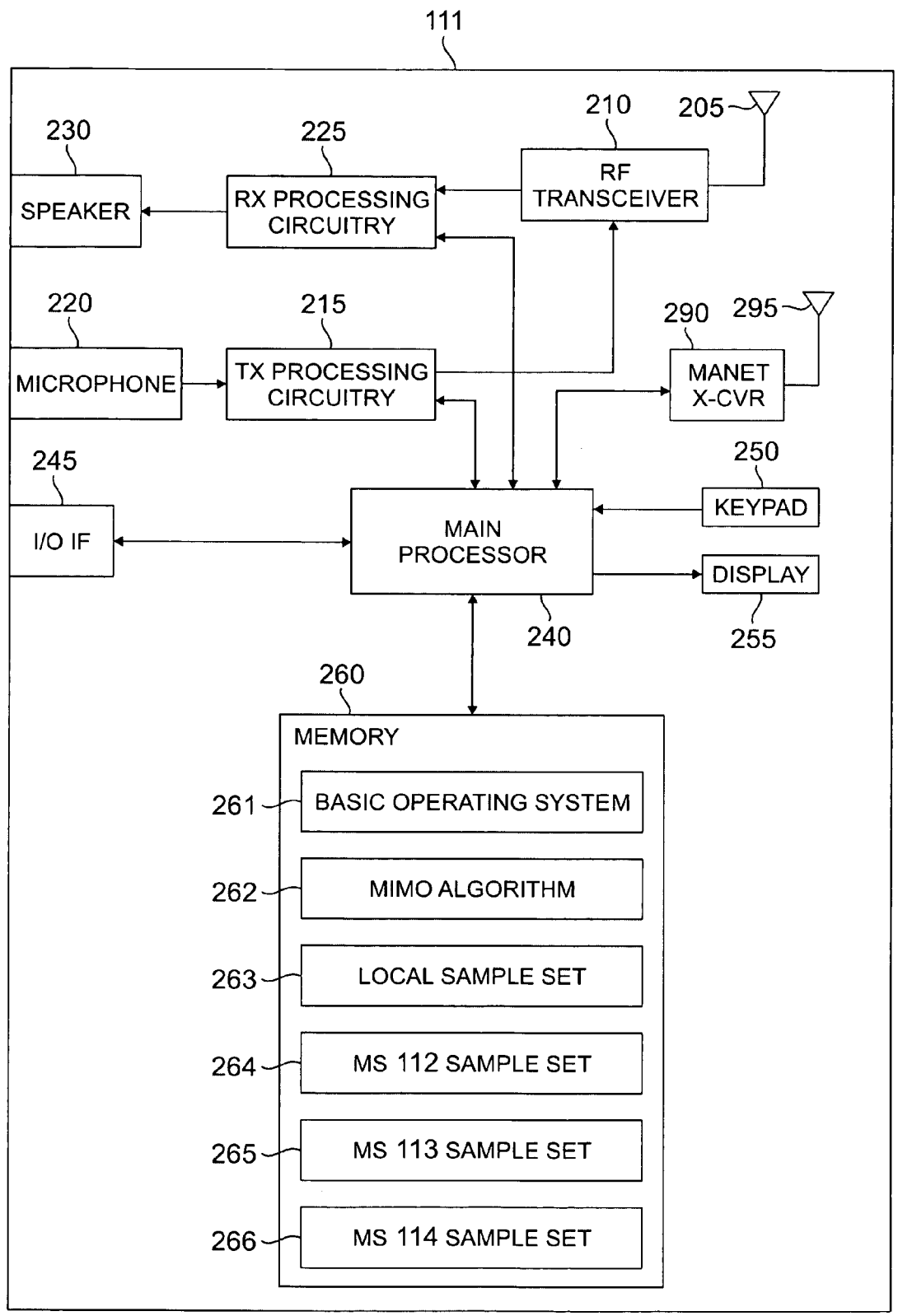
FIG. 2 illustrates an exemplary mobile station that implements a virtual MIMO antenna system according to an exemplary embodiment of the present invention.
Figure 3:
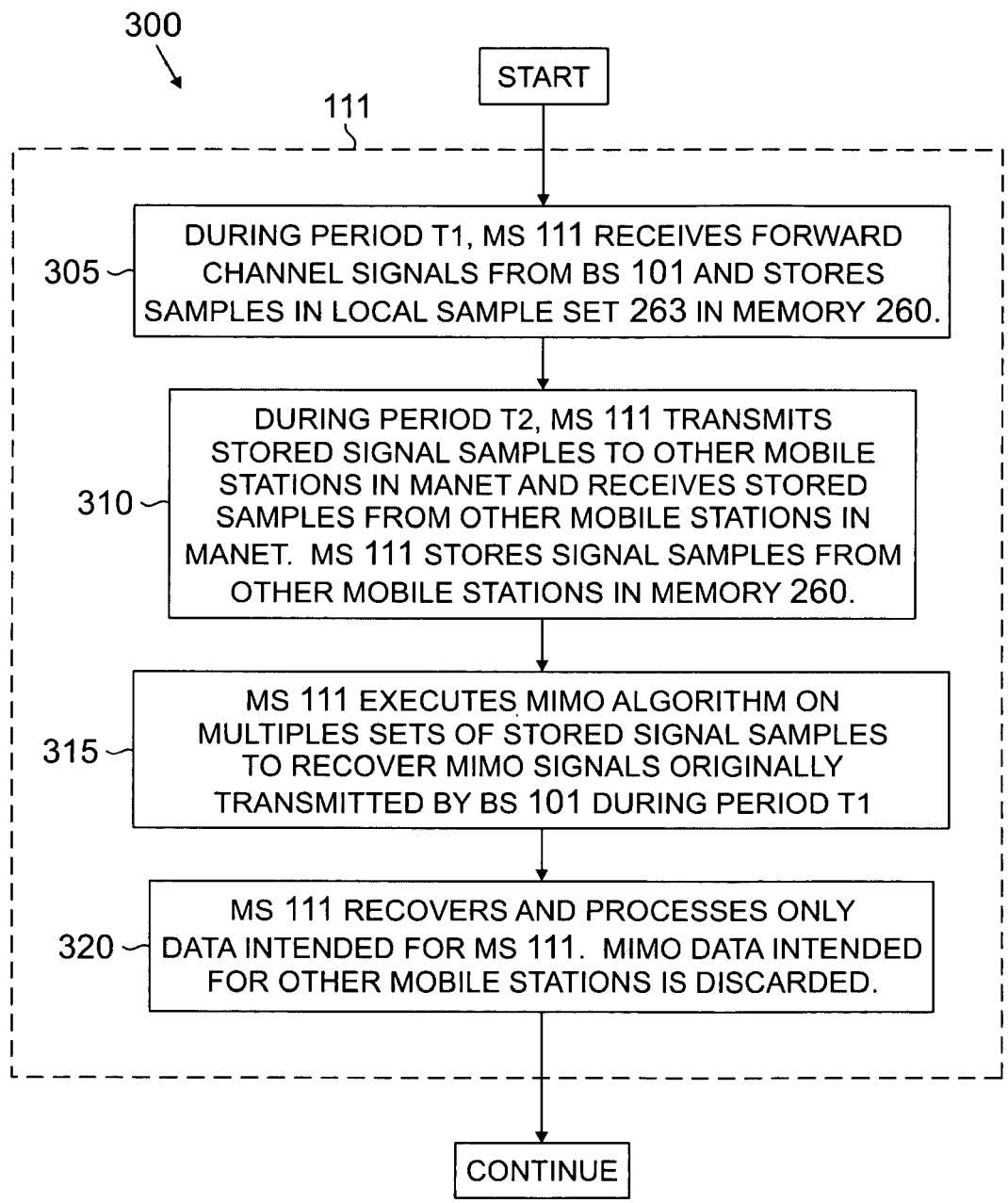
FIG. 3 is a flow diagram illustrating the operation of the exemplary mobile station according to the principles of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless communication system.

FIG. 1 illustrates communication system 100, which includes portions of a wide-area wireless network and a mobile ad hoc network (MANET) that provides virtual multiple-input, multiple-output (MIMO) antenna systems to mobile stations according to the principles of the present invention. Communication system 100 comprises base station 101, mobile station (MS) 111, mobile station (MS) 112, mobile station (MS) 113 and mobile station (MS) 114. In the illustrated embodiment, base station 101 is part of a wide-area wireless network having a large coverage area, such as a cellular phone network or a wireless local area network (WLAN). The remaining base stations and other infrastructure to which BS 101 is coupled are not shown.

In a typical embodiment, base station (BS) 101 may transmit digital data to mobile stations 111-114 according to the IEEE-802.16, IEEE-802.20, CDMA2000, 1xEv-DV, 1xEv-DO, or similar standards. BS 101 has a coverage area on the order of one to three kilometers in diameter. BS 101 transmits data in forward channels 120 to MS 111, MS 112, MS 113 and MS 114 at data rates on the order of 600 Kbps to 2 Mbps. According to the illustrated embodiment, BS 101 uses conventional multiple-input, multiple-output (MIMO) antenna system 102 to transmit data to and receive data from mobile stations 111-114. Antenna system 102 contains four antenna elements, labeled A, B, C and D.

Each one of mobile stations 111-114 is a conventional wireless terminal (e.g., cell phone, IEEE-802.11 device) that operates as a conventional MANET node. Mobile stations 111-114 use conventional single-input, single-output (SISO) antenna systems to transmit data to and receive data from BS 101. However, according to the principles of the present invention, mobile stations 111-114 are able to benefit from the MIMO signals transmitted by BS 101 by forming a mobile ad hoc network (MANET) that provides each mobile station with a virtual MIMO antenna system.

Dotted lines 131-134 represent some of the radio frequency (RF) links of the MANET. RF link 131 transfers data directly between MS 111 and MS 112. Similarly, RF link 132 transfers data directly between MS 112 and MS 113 and RF link 133 transfers data directly between MS 113 and MS 114. Finally, RF link 131 transfers data directly between MS 114 and MS 111. Other RF links in the MANET may be present, such as RF links between MS 111 and MS 113 and between MS 112 and MS 114. However, for the sake of clarity and simplicity, these other links are not shown.

As is well known, a MANET is a group of wireless nodes (e.g., MS 111-MS 114) that dynamically form a network with each other and without using any pre-existing fixed network infrastructure (e.g., BS 101). In most cases, wireless nodes of a MANET are small mobile devices that are relatively limited in term of CPU capability, memory size, and power consumption. Mobile ad hoc networks are expected to continue to grow over the next 2-3 years to become the dominant peer-to-peer communication technology. Cell phones are being equipped with IEEE-802.11 and other wireless LAN technologies for transmitting and receiving over MANET links.

As noted above, a mobile ad hoc network (MANET) can be set up without using a pre-existing network infrastructure. This can be done anywhere and at anytime. The wireless nodes of a MANET are free to move randomly and also act as routers. A MANET supports traffic types that are different from the traffic types typically found in an infrastructure-based wireless network. MANET traffic types include: 1) peer-to-peer traffic; 2) remote-to-remote traffic; and 3) dynamic traffic. In peer-to-peer traffic, there is only one hop between the communicating wireless nodes (i.e., direct communication). In remote-to-remote traffic, there are two or more hops between communicating wireless nodes, but a stable route is maintained between the source and destination nodes. This often occurs if several nodes stay within range of each other in one area or if the nodes move as a group. Dynamic traffic results when the MANET nodes move around and communication routes must be reconstructed.

The separation distances between mobile stations 111-114 are typically on the order of 20-50 meters. That is more than the 10 wavelength (i.e., 1 meter) separation needed to provide proper spatial diversity and gain the benefit of MIMO antenna system 102. At distances of 20-50 meters, mobile stations 111-114 may exchange data at data rates between 10 Mbps and 50 Mbps using, for example, IEEE-802.11 transceivers. This is considerably faster that the 600 Kbps to 2 Mbps data rates of the digital data received from BS 101 in the forward channels.

FIG. 2 illustrates exemplary mobile station 111, which implements a virtual MIMO antenna system according to an exemplary embodiment of the present invention. Wireless mobile station 111 comprises antenna 205, radio frequency (RF) transceiver 210, transmit (TX) processing circuitry 215, microphone 220, and receive (RX) processing circuitry 225. MS 111 also comprises speaker 230, main processor 240, input/output (I/O) interface (IF) 245, keypad 250, display 255, memory 260, mobile ad hoc network (MANET) transceiver (X-CVR) 290 and antennas 295. Memory 260 stores basic operating system (OS) program 261, multiple-input, multiple-output (MIMO) algorithm 262, local sample set 263, MS 112 sample set 264, MS 113 sample set 265, and MS 114 sample set 266.

In the exemplary embodiment, two transceivers are shown, namely RF transceiver 210 and MANET transceiver 290. According to the exemplary embodiment, MS 111 uses RF transceiver 210 to communicate over longer distances with base station 101 according to, for example, the CDMA2000 standard, the IEEE-802.16 standard, or the like. MS 111 uses MANET transceiver 290 to communicate over shorter distances with the other mobile stations (i.e., MS 112, MS 113, MS 114) according to, for example, the IEEE-802.11 standard. However, this dual transceiver configuration is by way of example only and should not be construed so as to limit the scope of the present application. What is necessary is that MS 111 be able to communicate with base stations of a wireless network and communicate directly with other mobile stations, as well. Thus, in an alternate embodiment of the present invention, MS 111 may implement only a single transceiver (e.g., software-defined radio) that is capable of being configured to communicate with BS 111 as well as other mobile stations.

Additionally, two antennas are shown in MS 111, namely antenna 205 and antenna 295. This dual antenna configuration is by way of example only and should not be construed so as to limit the scope of the present application. In reality, antenna 205 and antenna 295 may be the same antenna. In an advantageous embodiment of the present invention, MS 111 implements only a single antenna that is shared by transceiver 210 and transceiver 290.

Radio frequency (RF) transceiver 210 receives from antenna 205 incoming MIMO signals transmitted by base station 101. Radio frequency (RF) transceiver 210 down-converts the incoming MIMO signals to produce an intermediate frequency (IF) or a baseband signal. The IF or baseband signal is sent to receiver (RX) processing circuitry 225 that produces a processed baseband signal by filtering, decoding, and/or digitizing the baseband or IF signal. Receiver (RX) processing circuitry 225 transmits the processed baseband signal to speaker 230 (i.e., voice data) or to main processor 240 for further processing (e.g., web browsing).

Transmitter (TX) processing circuitry 215 receives analog or digital voice data from microphone 220 or other outgoing baseband data (e.g., web data, e-mail, interactive video game data) from main processor 240. Transmitter (TX) processing circuitry 215 encodes, multiplexes, and/or digitizes the outgoing baseband data to produce a processed baseband or IF signal. Radio frequency (RF) transceiver 210 receives the outgoing processed baseband or IF signal from transmitter (TX) processing circuitry 215. Radio frequency (RF) transceiver 210 up-converts the baseband or IF signal to a radio frequency (RF) signal that is transmitted via antenna 205 to BS 101.

In an advantageous embodiment of the present invention, main processor 240 is a microprocessor or microcontroller. Memory 260 is coupled to main processor 240. According to an advantageous embodiment of the present invention, part of memory 260 comprises a random access memory (RAM) and another part of memory 260 comprises a Flash memory, which acts as a read-only memory (ROM).

Main processor 240 executes basic operating system (OS) program 261 stored in memory 260 in order to control the overall operation of wireless mobile station 111. In one such operation, main processor 240 controls the reception of forward channel signals and the transmission of reverse channel signals by radio frequency (RF) transceiver 210, receiver (RX) processing circuitry 225, and transmitter (TX) processing circuitry 215, in accordance with well-known principles. Main processor 240 also controls the reception and transmission of MANET channel signals by MANET transceiver 290 according to well-known principles.

Main processor 240 is capable of executing other processes and programs resident in memory 260. Main processor 240 can move data into or out of memory 260, as required by an executing process. Main processor 240 is also coupled to I/O interface 245. I/O interface 245 provides mobile station 111 with the ability to connect to other devices such as laptop computers and handheld computers. I/O interface 245 is the communication path between these accessories and main controller 240.

Main processor 240 is also coupled to keypad 250 and display unit 255. The operator of mobile station 111 uses keypad 250 to enter data into mobile station 111. Display 255 may be a liquid crystal display capable of rendering text and/or at least limited graphics from web sites. Alternate embodiments may use other types of displays.

According to the principles of the present invention, main processor 240 receives from RF transceiver 210 (directly or via RX processing circuitry 225) samples of the forward channel MIMO signals transmitted by BS 101. These samples are stored in local sample set 263 in memory 260. Main processor 240 executes MIMO algorithm 262, which is a conventional MIMO algorithm capable of recovering MIMO signals from sets of received samples captured by a plurality of antennas. In a conventional MIMO receiver that has a plurality of spaced-apart antennas, samples from each antenna would be separately stored in memory 260. MIMO algorithm 262 would then filter and combine the set of samples from each antenna according to well-known principles and recover the original data streams transmitted by MIMO antenna system 102.

However, since MS 111 has a SISO antenna system, there is only one set of locally received samples (in local sample set 263) for MIMO algorithm 262 to process. Accordingly, the present invention overcomes this limitation by gathering synchronized samples from other MANET nodes and allowing MIMO algorithm 262 to process both the locally received samples from BS 101 and the received samples from other MANET nodes as if MS 111 had received the samples from other MANET nodes directly from BS 101.

FIG. 3 depicts flow diagram 300, which illustrates the operation of exemplary mobile station 111 according to the principles of the present invention. During an initial time period T1, MS 111 receives forward channel signals from BS 101 and stores the received samples in local sample set 263 in memory 260. For example, MS 111 may capture samples of the MIMO signal from BS 101 for a period of T1=5 milliseconds. Main processor 240 stores the samples from BS 101 in local sample set 253 (process step 305). Thereafter, during period T2, MS 111 transmits the BS 101 signal samples from local sample set 253 to other mobile stations in the mobile ad hoc network (MANET). In return, MS 111 receives from the other MANET mobile stations BS 101 signal samples that were captured and stored by the other MANET mobile stations during time period T1. Since the samples from the other MANET mobile stations were captured during T1, these external samples are synchronized with the locally received samples. Main processor 240 stores the signal samples from the other MANET mobile stations in memory 260 (process step 310).

Next, main processor 240 in MS 111 executes MIMO algorithm 262. Algorithm 262 uses the multiples sets of stored signal samples in local sample set 263, MS 112 sample set 264, MS 113 sample set 265, and MS 114 sample set 266 to recover the MIMO signals originally transmitted by BS 101 during period T1 (process step 315). Once the MIMO signals are recovered, MS 111 processes only the user data intended for MS 111. MS 111 discards the user data in the recovered MIMO signals that is addressed to other mobile stations (process step 320).

The reverse channel from MS 111 to BS 101 has not been discussed above, since it is generally not a problem to use a conventional MIMO antenna system on BS 101. Also, the reverse channel generally does not need to implement MIMO techniques since the reverse channel generally has a much lower data rate than the forward channel. Reverse channels and forward channels are frequently asymmetric due to the fact that mobile stations generally receive large quantities of data (e.g., web pages, video files) from base stations and generally transmit much shorter messages (e.g., acknowledgements, commands) to base stations.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network comprising a first base station capable of transmitting a plurality of user data streams in a forward channel using a multiple-input, multiple-output (MIMO) antenna system, a first mobile station capable of implementing a virtual MIMO antenna system to receive MIMO data signals transmitted by said first base station, said first mobile station comprising:
   a first transceiver capable of receiving and down-converting said MIMO data signals transmitted by said first base station and storing a first plurality of samples of said MIMO data signals in a memory of said first mobile station; and
   a second transceiver capable of communicating directly with a second mobile station and receiving from said second mobile station a second plurality of samples of MIMO data signals received by said second mobile station from said first base station,
   wherein said first mobile station stores said second plurality of samples of MIMO data signals in said memory,
   wherein the first plurality of samples of said MIMO data signals and the second plurality of samples of MIMO data signals can be combined in the first mobile station as though they were received directly from the first base station as a single MIMO transmission.

2. The first mobile station as set forth in claim 1, further comprising a data processor capable of executing a MIMO algorithm, wherein said MIMO algorithm generates from said first and second plurality of samples said plurality of user data streams transmitted by said base station.

3. The first mobile station as set forth in claim 2, wherein said first and second plurality of samples are synchronized.

4. The first mobile station as set forth in claim 2, wherein said second transceiver communicates directly with said second mobile station over a mobile ad hoc network (MANET) link.

5. The first mobile station as set forth in claim 2 wherein said data processor detects in said plurality of user data streams first data directed to said first mobile station.

6. The first mobile station as set forth in claim 2 wherein said first and second transceivers are the same transceiver.

7. The first mobile station as set forth in claim 2, wherein said mobile station uses a single-input, single output (SISO) antenna system coupled to said first transceiver to receive said MIMO data signals transmitted by said first base station.

8. The first mobile station as set forth in claim 2, wherein said second transceiver transmits said first plurality of samples of said MIMO data signals to said second mobile station.

9. The first mobile station as set forth in claim 2, wherein said second transceiver is further capable of communicating directly with a third mobile station and receiving from said third mobile station a third plurality of samples of MIMO data signals received by said third mobile station from said first base station, wherein said first mobile station stores said third plurality of samples of MIMO data signals in said memory.

10. The first mobile station as set forth in claim 9, wherein said MIMO algorithm generates from said first, second and third plurality of samples said plurality of user data streams transmitted by said base station.

11. The first mobile station as set forth in claim 10, wherein said second transceiver transmits said first plurality of samples of said MIMO data signals to said third mobile station.

12. For use in a wireless network comprising a first base station capable of transmitting a plurality of user data streams in a forward channel using a multiple-input, multiple-output (MIMO) antenna system, a method of receiving in a first mobile station MIMO data signals transmitted by the first base station, the method comprising the steps of: receiving and down-converting the MIMO data signals transmitted by the first base station;

storing a first plurality of samples of the MIMO data signals in a memory of the first mobile station;

receiving directly from a second mobile station a second plurality of samples of MIMO data signals received by the second mobile station from the first base station;

and storing the second plurality of samples of MIMO data signals in the memory, wherein the MIMO data signals received from the first base station and the second plurality of samples of MIMO data signals received from the second mobile station can be combined as though they were received directly from the first base station as a single MIMO transmission.

13. The method as set forth in claim 12, further comprising the step of executing a MIMO algorithm in the first mobile station, wherein the MIMO algorithm generates from the first and second plurality of samples the plurality of user data streams transmitted by the base station.

14. The method as set forth in claim 13, wherein the first and second plurality of samples are synchronized.

15. The method as set forth in claim 13, wherein the step of receiving a second plurality of samples of MIMO data signals directly from the second mobile station comprises the step of receiving a second plurality of samples of MIMO data signals form the second mobile station over a mobile ad hoc network (MANET) link.

16. The method as set forth in claim 13, further comprising the step of detecting in the plurality of user data streams first data directed to the first mobile station.

17. The method as set forth in claim 13, further comprising the step of transmitting the first plurality of samples of the MIMO data signals to the second mobile station.

18. The method as set forth in claim 13, further comprising the steps of:

receiving directly from a third mobile station a third plurality of samples of MIMO data signals received by the third mobile station from the first base station; and storing the third plurality of samples of MIMO data signals in the memory.

19. The method as set forth in claim 18, wherein the MIMO algorithm generates from the first, second and third plurality of samples the plurality of user data streams transmitted by the base station.

20. The method as set forth in claim 19, further comprising the step of transmitting the first plurality of samples of the MIMO data signals to the third mobile station.

\* \* \* \* \*